No. 787,943. PATENTED APR. 25, 1905.
L. G. PRICE.
GATE.
APPLICATION FILED JUNE 2, 1902.

2 SHEETS—SHEET 1.

Witnesses
J. P. Britt
Harry A. Chandler

Inventor
L. G. Price,
By Chandler & Chandler
Attorneys

No. 787,943. PATENTED APR. 25, 1905.
L. G. PRICE.
GATE.
APPLICATION FILED JUNE 2, 1902.
2 SHEETS—SHEET 2.
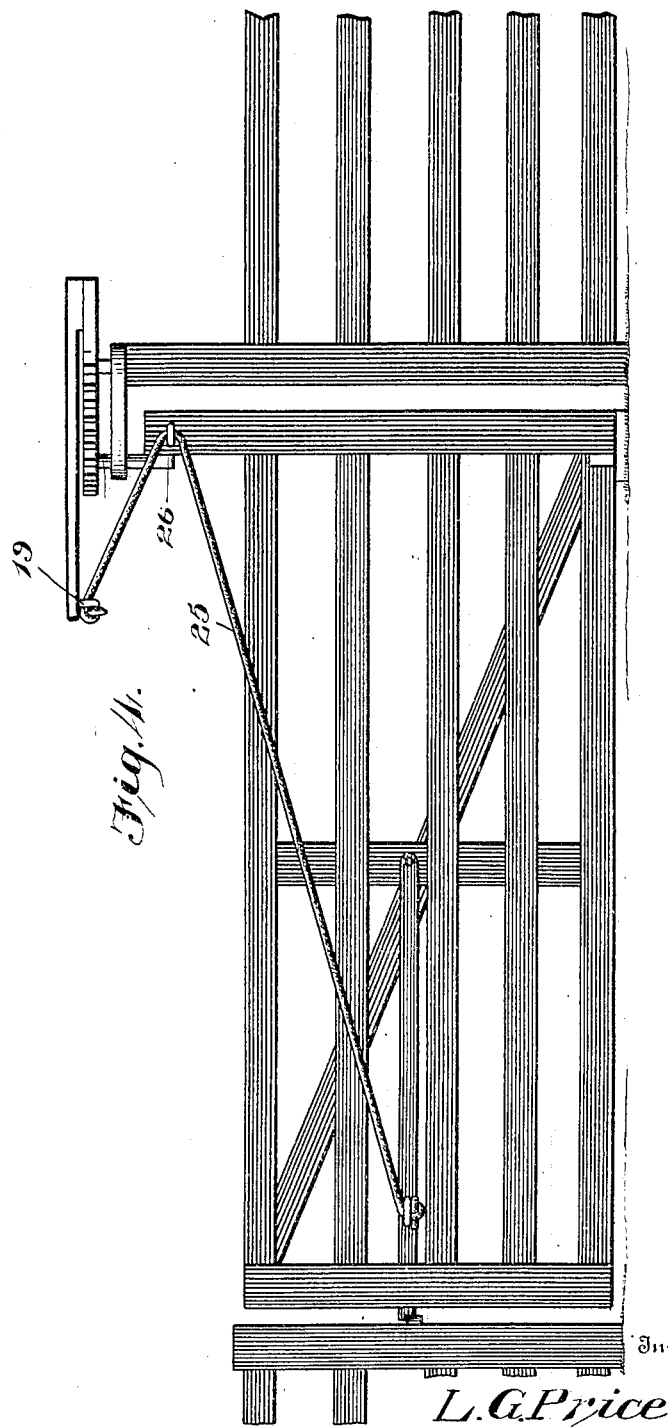
Witnesses
T. P. Brett
Harry Ellis Chandler
Inventor
L. G. Price,
By Chandler & Chandler
Attorneys No. 787,943.  
Patented April 25, 1905.

UNITED STATES PATENT OFFICE.

LARKIN G. PRICE, OF KINGS VALLEY, OREGON.

GATE.

SPECIFICATION forming part of Letters Patent No. 787,943, dated April 25, 1905.

Application filed June 2, 1902. Serial No. 109,891.

*To all whom it may concern:*

Be it known that I, LARKIN G. PRICE, a citizen of the United States, residing at Kings Valley, in the county of Benton, State of Oregon, have invented certain new and useful Improvements in Gates; and I do hereby declare the following to be a full, clear, and exact description of the invention, such as will enable others skilled in the art to which it appertains to make and use the same.

This invention relates to gates in general, and more particularly to the class of road-gates; and it has for its object to provide a construction which may be applied to any common form of gate and through the medium of which the gate may be unlatched and opened by a single movement of a lever, further objects and advantages of the invention being apparent from the following description.

Figure 1:
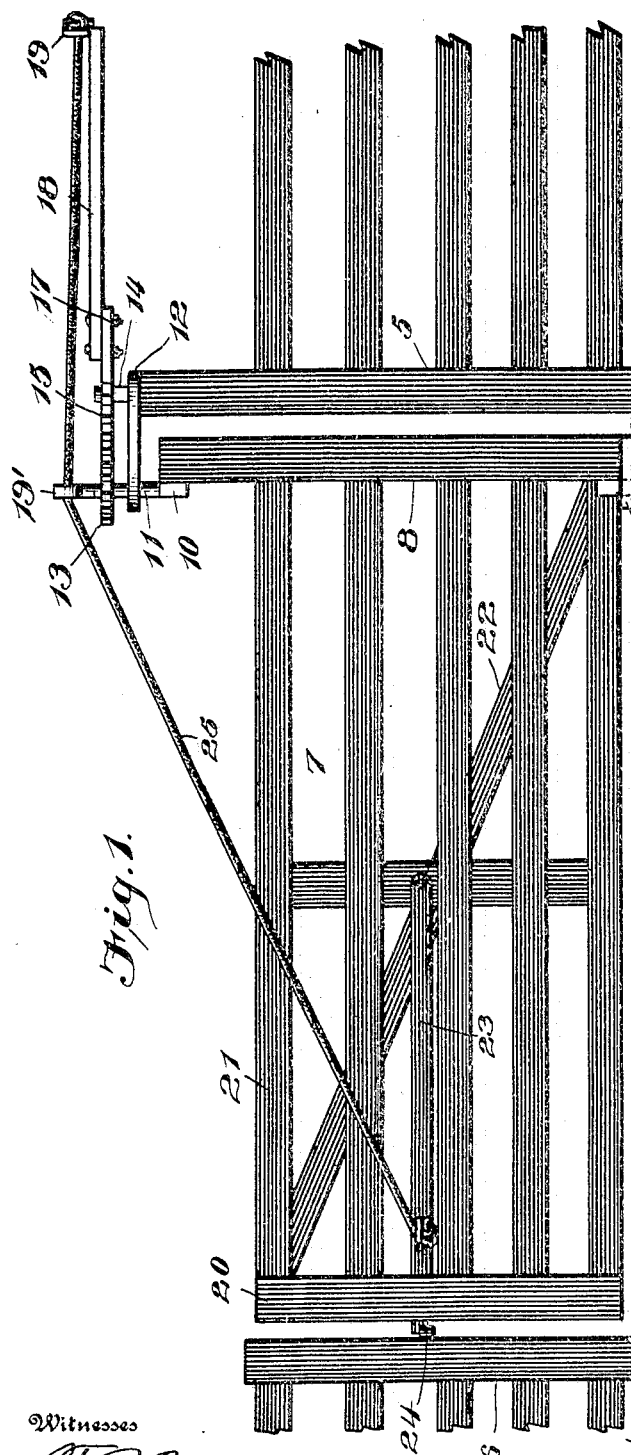
Figure 2:
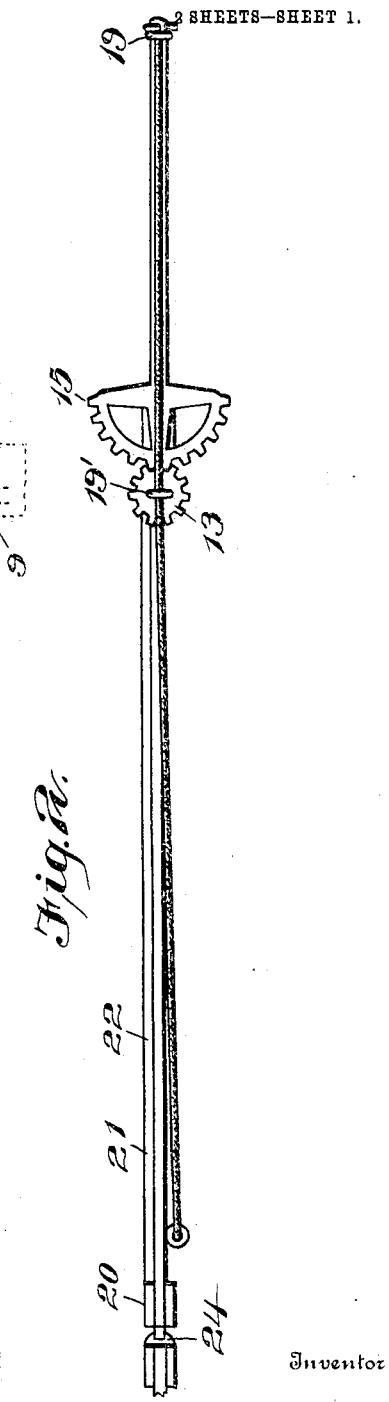

In the drawings forming a portion of this specification, and in which like numerals of reference indicate similar parts in the several views, Figure 1 is an elevation showing a gate closed and equipped in accordance with the present invention. Fig. 2 is a top plan view of the gate with its equipments. Fig. 3 is a view showing in plan several disconnected members of the mechanism. Fig. 4 is an elevation similar to Fig. 1 and showing a modified construction.

Referring now to the drawings, there is shown a hinge-post 5 and a latch-post 6, between which is disposed a gate 7, which, however, instead of being hinged directly to the post 5, as usual, has the upright 8 at the hinge end thereof stepped in a socket 9, while bolted to the upper portion of the same upright is the metallic plate 10, having the cylindrical upwardly-projecting terminal portion 11, which forms the upper pintle for the gate. The cylindrical portion 11 has a bearing in a perforation formed in the projecting end portion of a metallic plate 12, which is secured firmly upon the upper end of the post 5 and extends in the direction of the post 6, the portion 11 of the plate 10 extending a distance above the plate 12 and having a pinion 13 secured to the upper end thereof.

Engaged through a perforation in the plate 12 and entering the post 5 is a pivot-pin 14, on which is pivoted a segmental gear 15, which meshes with the pinion, so that when the gear is oscillated the pinion will be similarly moved and therewith the upright of the gate to move the gate to open or closed position. The segmental gear has an extension 17, upon which is bolted a lever 18, which extends rearwardly of the gear, and at one end is an upwardly-directed eye 19 for a purpose to be presently explained. A second eye 19' is disposed upon the upper end of the upper gate-pintle above the pinion and has a socket in its lower end to receive the squared upper end of the pintle.

The gate, as shown, includes also a second upright 20, cross-pieces 21, and a batter-post or brace 22, the gate having also a common form of latch consisting of the strip 23, pivoted at one end to permit its outer end to be raised from and dropped into engagement with the latch-keeper 24 on post 6. A cord 25 is attached to the strip 23 near to its free end and is taken upwardly and through the eyes 19' and 19 and is attached to the opposite end of the lever.

With this construction it will be seen that when the gate is to be opened the cord is grasped and moved to raise the latch, thus tightening the cord between the latch and the eye 19. Further pulling of the cord moves the lever pivotally and the gate is swung open. When the gate is to be closed, the lever is moved in an opposite direction. With the arrangement of the eyes it will be seen that it is not necessary to pull the cord before operating the lever, as the movement of the lever draws the cord in a direction away from that taken by the gate, so that the latch is lifted automatically.

In Fig. 4 of the drawings there is shown a construction wherein the parts are similar to those shown in Fig. 1, with the exception that the eye 19' is omitted from the upper end of the pintle 11 and in place thereof an eye 26 is fixed to the upright 8 at the hinge end of the gate. In this construction also the lever 18 instead of extending over the hinge-post of the fence is reversed in position and extends over the gateway, the cord 25 being passed through the eye 26 and then through the eye 19 at the under side of the lever.

It will be understood that in practice other modifications may be made and that any suitable materials and proportions may be used for the various parts without departing from the spirit of the invention.

What is claimed is—

The combination with gate-posts, of a gate disposed therebetween, said gate including uprights, connecting-rails and a vertically-movable latch-bar pivotally mounted for engagement with one of the posts, the upright of the gate at the opposite end from the latch being pivoted at its lower end and being shorter than the adjacent post, a bearing-plate disposed against said adjacent post and projecting over and beyond the pivoted upright and having a bearing therein beyond said upright, a plate secured to the upper end of the pivoted upright of the gate and having a pintle engaged in the bearing of the bearing-plate and projecting above the latter, said pintle having an eye at its upper end, a pinion fixed upon the pintle below the eye, a pivot-pin passed through the bearing-plate into the post on which it is disposed, a segmental gear mounted upon the pivot-pin and engaging the pinion, a lever attached to the gear, and a cord secured to the free end of the lever and passed through the eye of the pintle and connected directly with the latch-bar, whereby when the cord is grasped between the eye and the free end of the lever and pulled, the latch will rise and the lever subsequently swing to open the gate.

In testimony whereof I affix my signature in presence of two witnesses.

LARKIN G. PRICE.

Witnesses:
W. L. PRICE,
W. B. PRICE.